United States Patent
Cui et al.

(10) Patent No.: US 10,958,578 B2
(45) Date of Patent: *Mar. 23, 2021

(54) OPTIMIZED ROUTING IN CONNECTED ENVIRONMENTS

(71) Applicant: AT&T Intellectual Property I, L.P., Atlanta, GA (US)

(72) Inventors: Zhi Cui, Sugar Hill, GA (US); Jing Wu, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,600

(22) Filed: Jul. 20, 2018

(65) Prior Publication Data

US 2018/0331956 A1    Nov. 15, 2018

Related U.S. Application Data

(63) Continuation of application No. 14/714,296, filed on May 17, 2015, now Pat. No. 10,057,172.

(51) Int. Cl.
| | |
|---|---|
| *H04L 12/803* | (2013.01) |
| *H04W 4/02* | (2018.01) |
| *H04W 40/22* | (2009.01) |
| *H04W 76/14* | (2018.01) |
| *H04W 88/04* | (2009.01) |

(52) U.S. Cl.
CPC .......... *H04L 47/122* (2013.01); *H04W 4/023* (2013.01); *H04W 40/22* (2013.01); *H04W 76/14* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 8,619,136 B2 | 12/2013 | Howarter et al. | |
| 8,953,040 B1 | 2/2015 | Scalisi et al. | |
| 9,270,634 B1 | 2/2016 | Gu | |
| 10,057,172 B2 * | 8/2018 | Cui .................... | H04L 47/122 |
| 2005/0169285 A1 * | 8/2005 | Wills .................... | H04L 69/08 |
| | | | 370/401 |
| 2006/0221183 A1 | 10/2006 | Sham | |

(Continued)

FOREIGN PATENT DOCUMENTS

| | | |
|---|---|---|
| CN | 102254385 A | 11/2011 |
| CN | 103473839 A | 12/2013 |
| KR | 2015004059 A | 1/2015 |

OTHER PUBLICATIONS

Unknown, "SkyBell 2.0—Video Doorbell", Mar. 13, 2015, 4 pages.
Unknown, "WiFi Video Door Phone", Smart Industry Corp., Date Unknown, 13 pages.

*Primary Examiner* — Charles C Jiang
*Assistant Examiner* — Saad Khawar
(74) *Attorney, Agent, or Firm* — Guntin & Gust, PLC; Jay Anderson

(57) ABSTRACT

Geographic proximity and network congestion are used to determine efficient routing of data in networks. If two devices are geographically close, then device-to-device communication may be possible. Data may thus be routed using device-to-device communication, which avoids consuming bandwidth in wide area networks and in cellular networks.

20 Claims, 23 Drawing Sheets

(56) References Cited

U.S. PATENT DOCUMENTS

| | | |
|---|---|---|
| 2009/0305732 A1 | 12/2009 | Marcellino |
| 2009/0307715 A1 | 12/2009 | Santamaria |
| 2010/0262709 A1* | 10/2010 | Hiie .................... H04L 12/1827 |
| | | 709/231 |
| 2012/0149344 A1 | 6/2012 | Dasgupta |
| 2012/0182382 A1 | 7/2012 | Serramalera |
| 2013/0045763 A1 | 2/2013 | Ruiz |
| 2013/0046879 A1 | 2/2013 | Garcia |
| 2013/0057695 A1 | 3/2013 | Huisking |
| 2013/0086278 A1* | 4/2013 | Schmidt .............. H04L 41/5009 |
| | | 709/231 |
| 2013/0167196 A1 | 6/2013 | Spencer |
| 2014/0070922 A1 | 3/2014 | Davis |
| 2014/0098227 A1 | 4/2014 | Chen et al. |
| 2014/0259147 A1 | 9/2014 | L'Heureux |
| 2015/0022618 A1 | 1/2015 | Siminoff |
| 2015/0049191 A1* | 2/2015 | Scalisi .................... H04N 7/186 |
| | | 348/143 |
| 2015/0052222 A1 | 2/2015 | Farrell |
| 2015/0062337 A1 | 3/2015 | Scalisi |
| 2015/0116490 A1 | 4/2015 | Scalisi |
| 2015/0145993 A1* | 5/2015 | Scalisi .................... G08B 25/10 |
| | | 348/143 |
| 2015/0230150 A1* | 8/2015 | Wang ................ H04B 7/18506 |
| | | 370/252 |
| 2016/0044165 A1 | 2/2016 | Dudai |
| 2016/0080962 A1 | 3/2016 | Harris |
| 2016/0248474 A1 | 8/2016 | Gilson |
| 2016/0262082 A1 | 9/2016 | Flynn |
| 2016/0262191 A1 | 9/2016 | Flynn |

\* cited by examiner

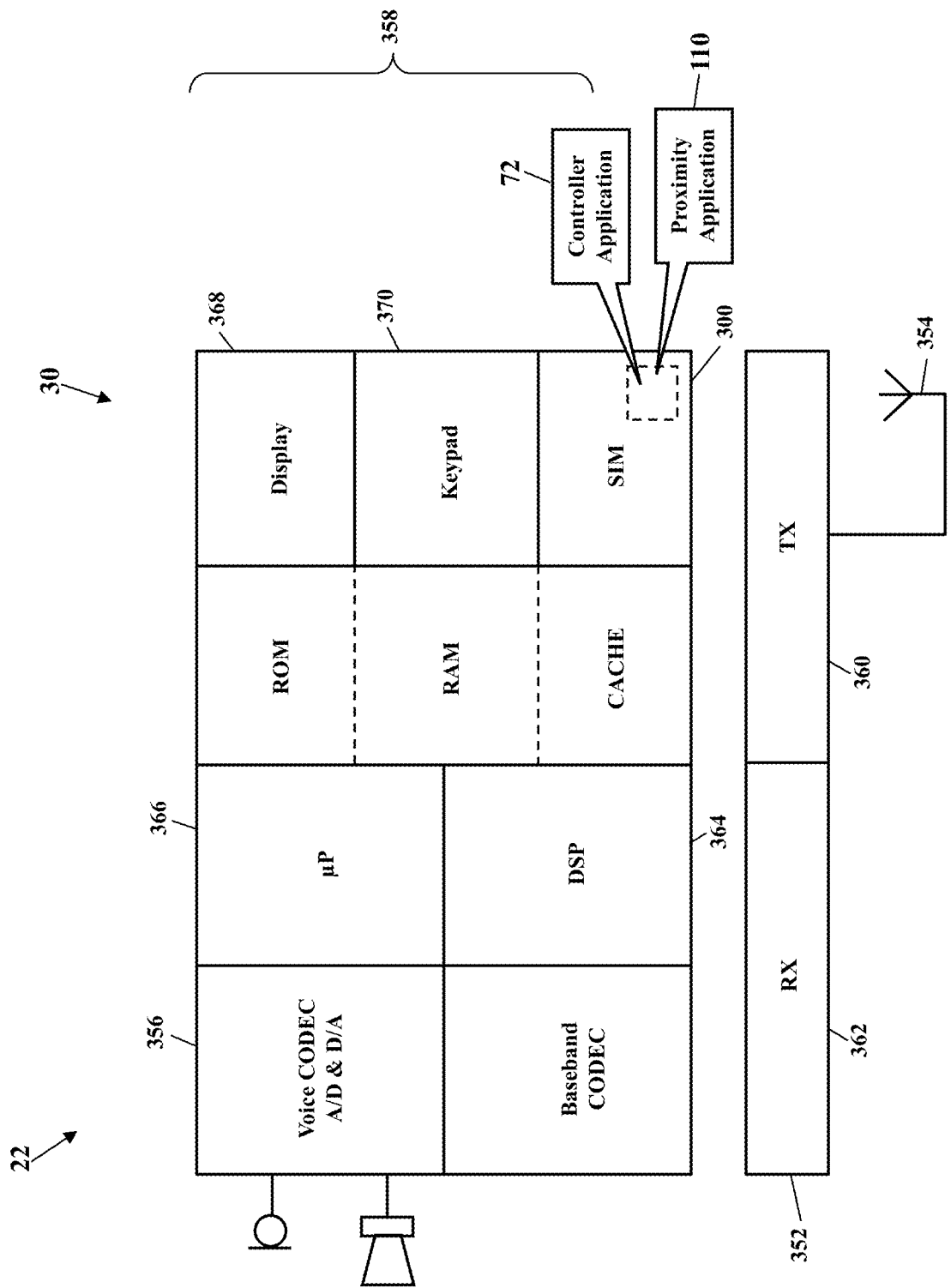

OPTIMIZED ROUTING IN CONNECTED ENVIRONMENTS

CROSS-REFERENCE TO RELATED APPLICATION

This application is a continuation of U.S. application Ser. No. 14/714,296 filed May 17, 2015, since issued as U.S. Pat. No. 10,057,172, and incorporated herein by reference in its entirety.

BACKGROUND

Video streaming can waste network resources. For example, many people request video data for delivery to their mobile devices. However, the video data is often sent into a cellular or other broadband network and routed perhaps hundreds of miles, even though a mobile device is within feet of a WI-FI® or other peer-to-peer network. Cellular and network bandwidth are unnecessarily consumed and transmission delay and jitter may be introduced.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 19-24 depict still more operating environments for additional aspects of the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
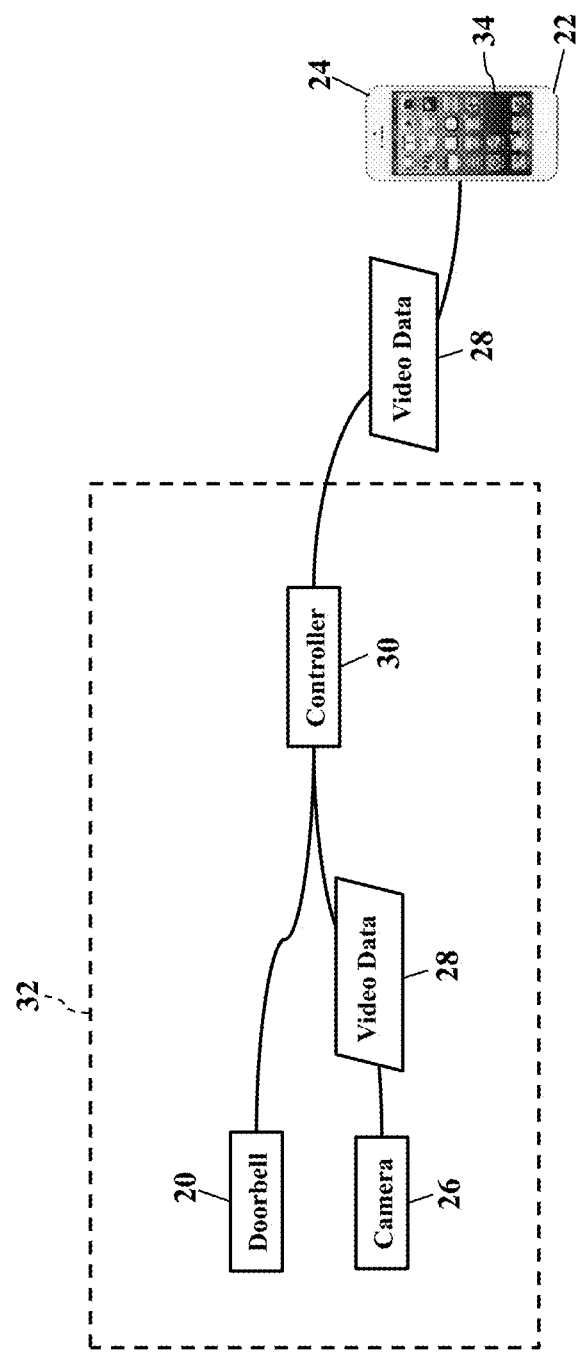
FIGS. 1-4 are simplified schematics illustrating an environment in which exemplary embodiments may be implemented.

FIGS. 1-4 are simplified schematics illustrating remote notification of video data, according to exemplary embodiments. While exemplary embodiments may be implemented in many environments, FIG. 1 illustrates a common residential environment that most readers will understand. When a human visitor activates a doorbell 20 at a front door, exemplary embodiments notify a mobile device 22. The mobile device 22, for simplicity, is illustrated as a smartphone 24. When the visitor rings the doorbell 20, a camera 26 may capture live video data 28 of the visitor at the door. The video data 28 is then routed over a wireless or wired connection (not shown for simplicity) to a controller 30 of a security system 32. As the reader likely knows, many homes and businesses have security systems that protect occupants from fire, intrusion, and other security conditions. When the controller 30 receives the video data 28, the controller 30 is often programmed to send the video data 28 to some remote location for monitoring. FIG. 1 illustrates the video data 28 routing for delivery to the smartphone 24. When the smartphone 24 receives the video data 28, the smartphone 24 processes the video data 28 for display (such as by a touch screen display device 34). The user of the smartphone 24 may thus remotely see the human visitor that activated the doorbell 20.

Figure 2:
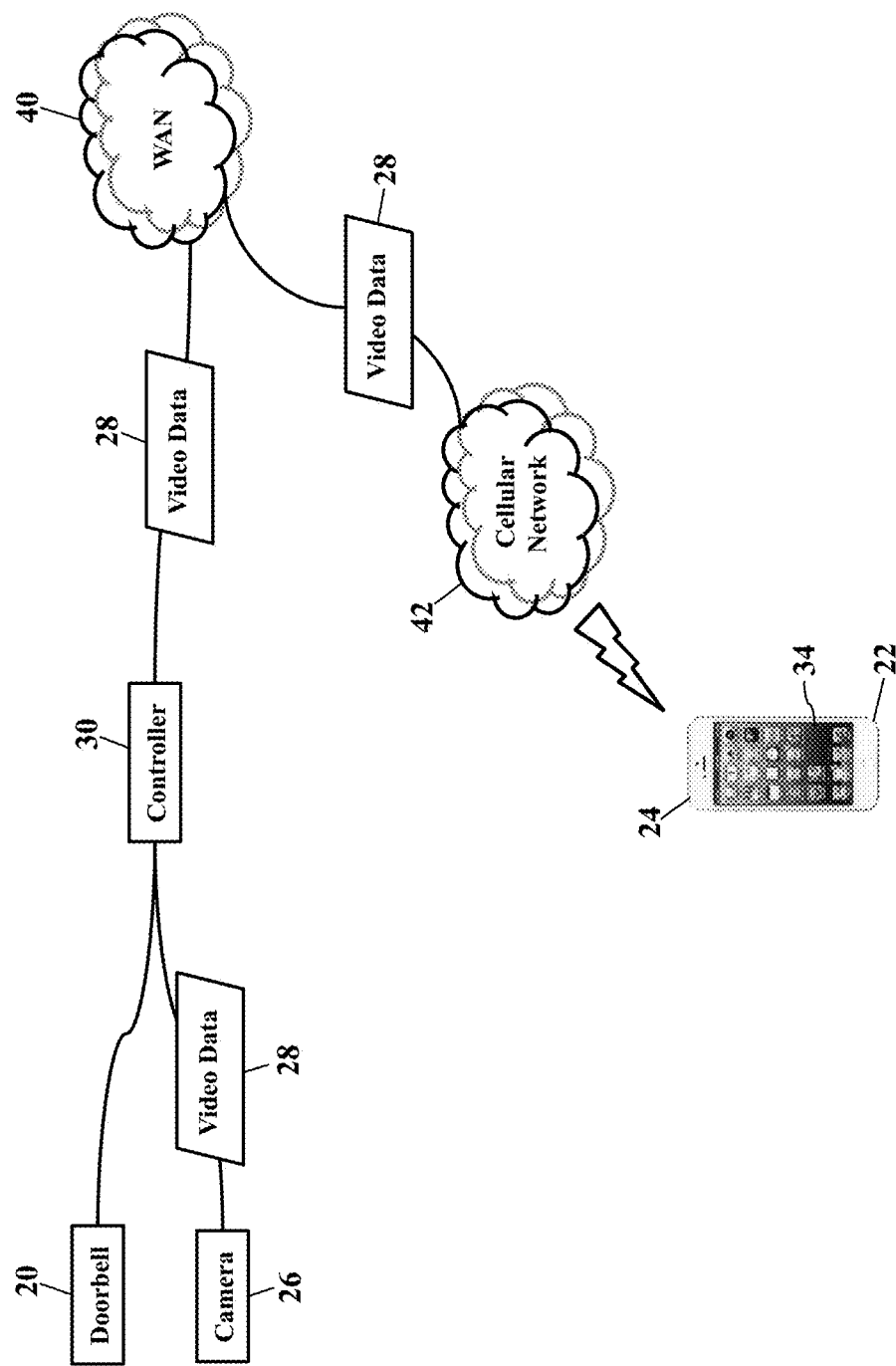

FIG. 2 illustrates inefficient routing. When the controller 30 receives the video data 28, the controller 30 may inefficiently send the video data 28 over a wired or wireless connection to a wide area communications network (or "WAN") 40. The video data 28 may then route into a cellular network 42 for wireless transmission from a base station to the smartphone 24. The video data 28 may thus travel along many miles of communications cables before being wirelessly transmitted to the smartphone 24. These lengthy communications paths consume precious bandwidth in the wide area communications network 40. Moreover, the video data 28 also consumes bandwidth and radio frequency spectrum in the cellular network 42. These communications paths also introduce packet delay and jitter, thus degrading the quality of the video data 28.

Figure 3:
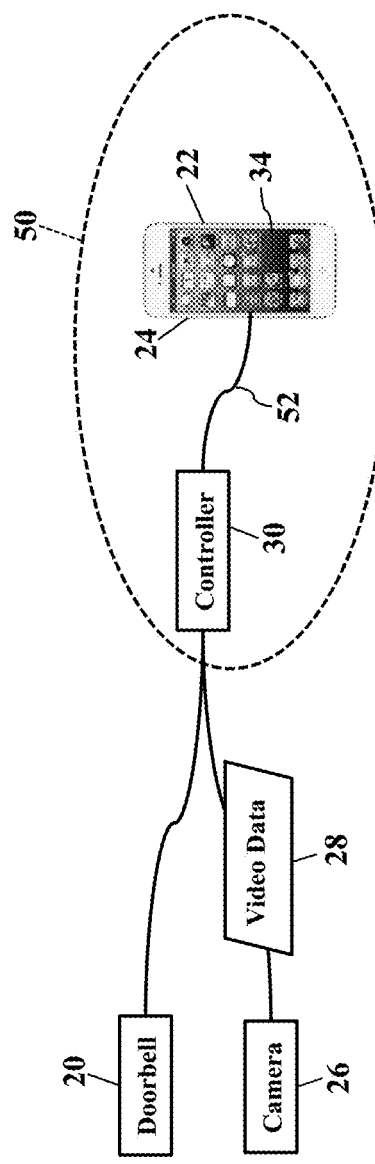

FIG. 3, though, illustrates optimized routing. Here, before the controller 30 routes the video data 28 to the smartphone 24, exemplary embodiments may first determine the geographic proximity 50 of the smartphone 24 to the controller 30. If the smartphone 24 is geographically close and/or physically proximate to the home controller 30, exemplary embodiments may select a shorter communications path 52 to the smartphone 24. That is, exemplary embodiments may select a packet routing that traverses a physically shorter distance from the controller 30 to the smartphone 24, based on the geographic proximity 50. If the controller 30 and the smartphone 24 are geographically close, routing links or sections may be chosen that reduce distances traversed and packet switching. Packets in the video data 28 may thus traverse less physical distance, which also reduces jitter and delay. Bandwidth consumption is reduced, and the smartphone 24 renders an improved visual experience for the end user.

Figure 4:
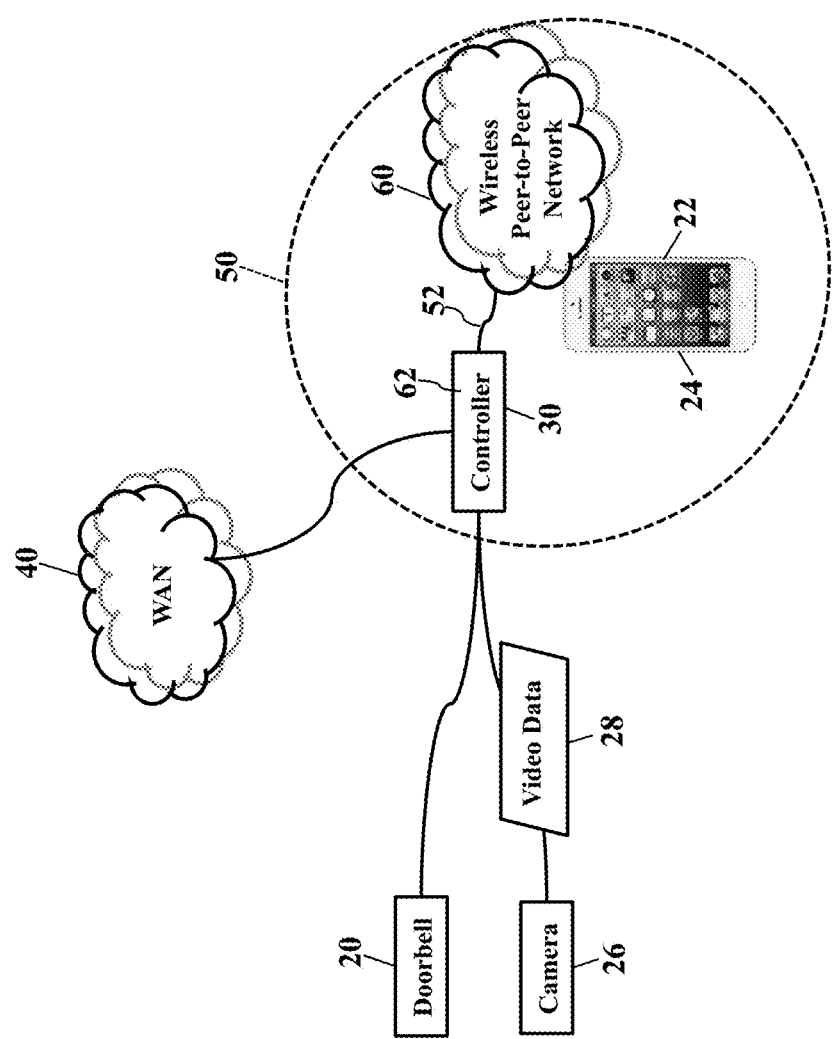

FIG. 4 illustrates one such efficient, shorter communications path 52. When the controller 30 receives the video data 28, exemplary embodiments may determine that alternative communications paths are available. For example, the controller 30 may have multiple communications paths with the mobile device 22. The controller 30, as previously explained, may communicate with the smartphone 24 via a first physical wired connection or a wireless connection with the wide area communications network 40. The controller 30, however, may also separately or simultaneously communicate with the smartphone 24 via a second wireless connection to a local wireless peer-to-peer network 60. If the controller 30 can verify communications using the wireless peer-to-peer network 60, the controller 30 may decline routing the video data 28 into the wide area communications network 40. The controller 30, instead, may route the video data 28 into the wireless peer-to-peer network 60 for delivery to the smartphone 24, as the wireless peer-to-peer network 60 likely provides a shorter communications path 52. For example, the controller 30 may wirelessly transmit the video data 28 to the smartphone 24. The controller 30 may have one or more wireless transceivers 62 that are capable of unicasting the video data 28 to the smartphone 24. The controller 30, for example, may transmit the video data 28 using cellular frequencies and standards. The controller 30, however, may additionally or alternatively transmit the video data 28 using wireless fidelity ("WI-FI®") frequencies and standards. Regardless, if the smartphone 24 is geographically proximate to the controller 30, the controller 30 and the smartphone 24 may utilize device-to-device communications protocols. The wireless peer-to-peer network 60 thus provides the much shorter communications path 52, which reduces bandwidth consumption with little or no degradation. User experiences are also improved.

Figure 5:
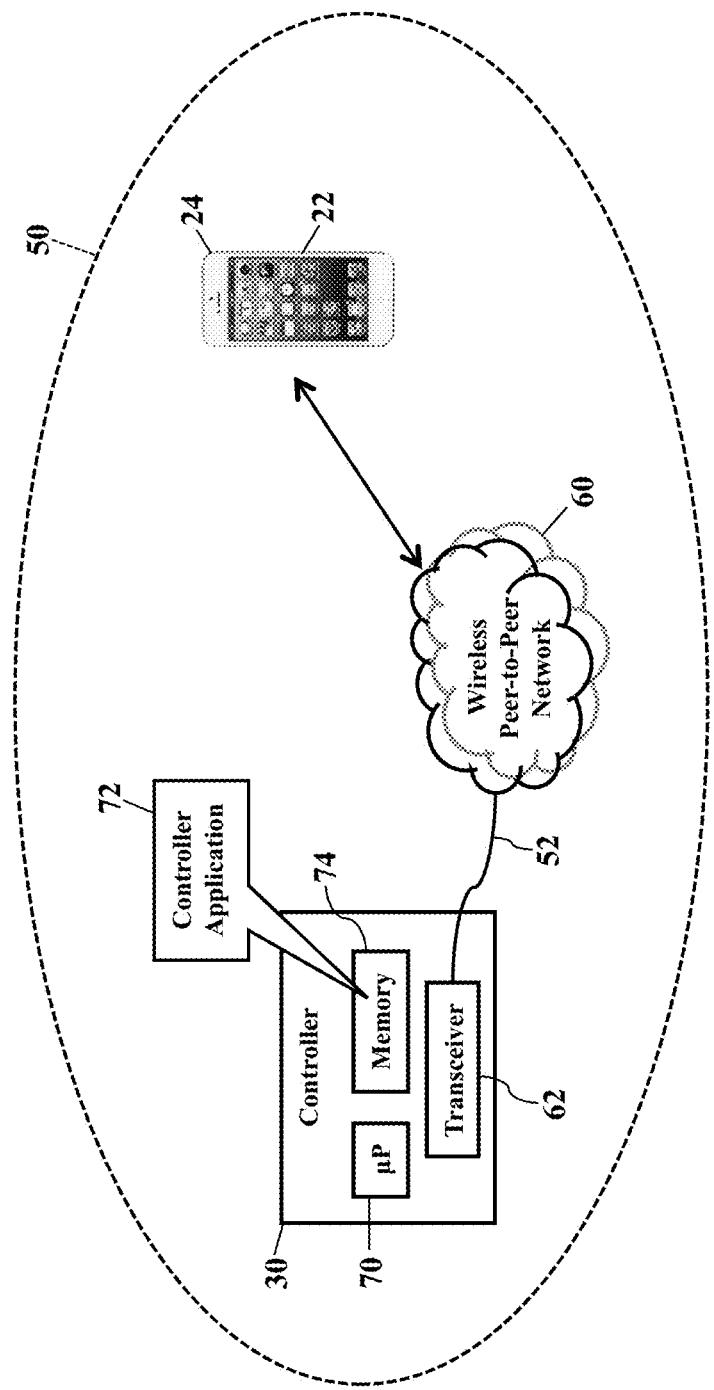
FIGS. 5-7 are more detailed block diagrams illustrating the operating environment, according to exemplary embodiments.
Figure 6:
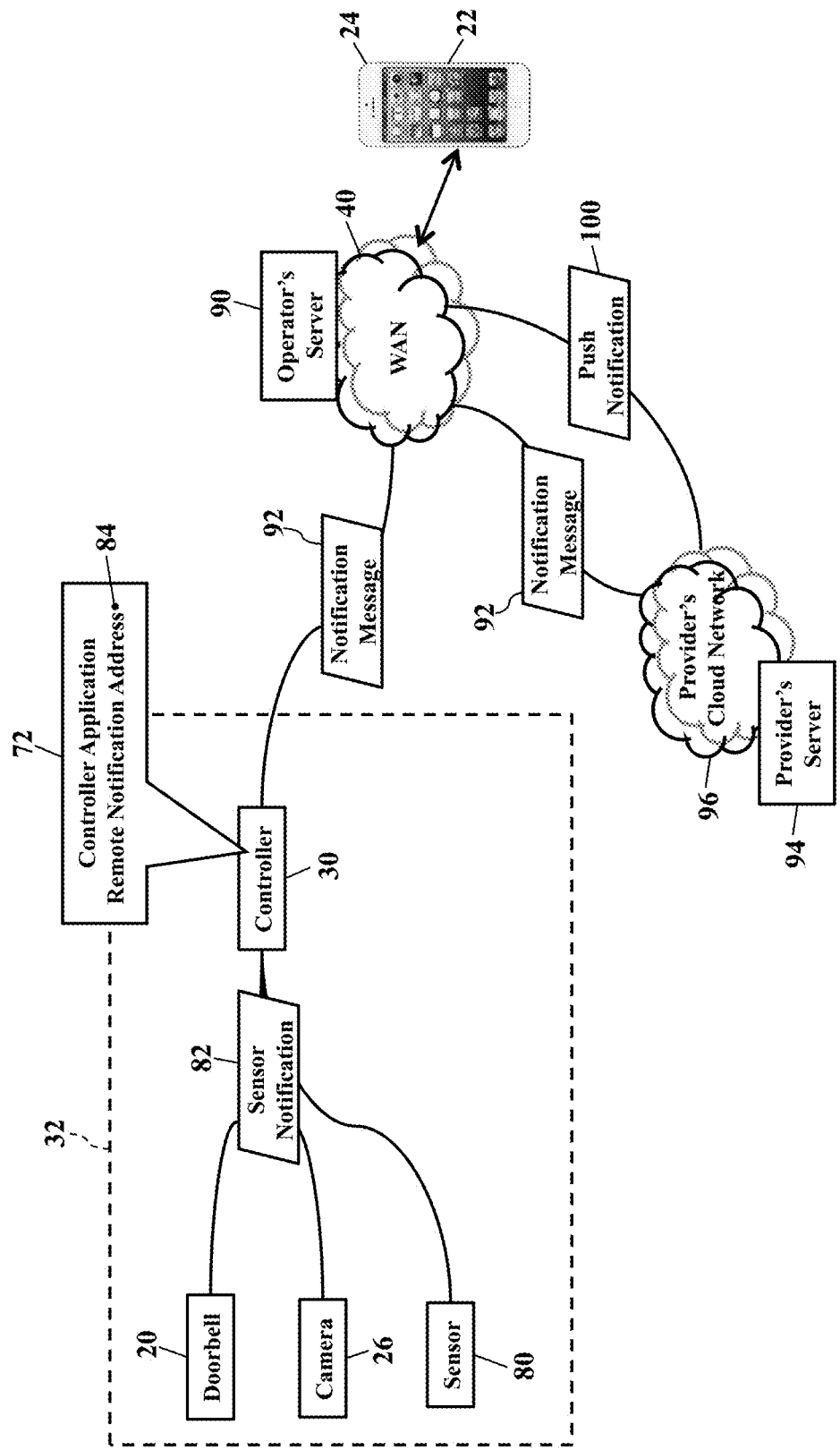
Figure 7:
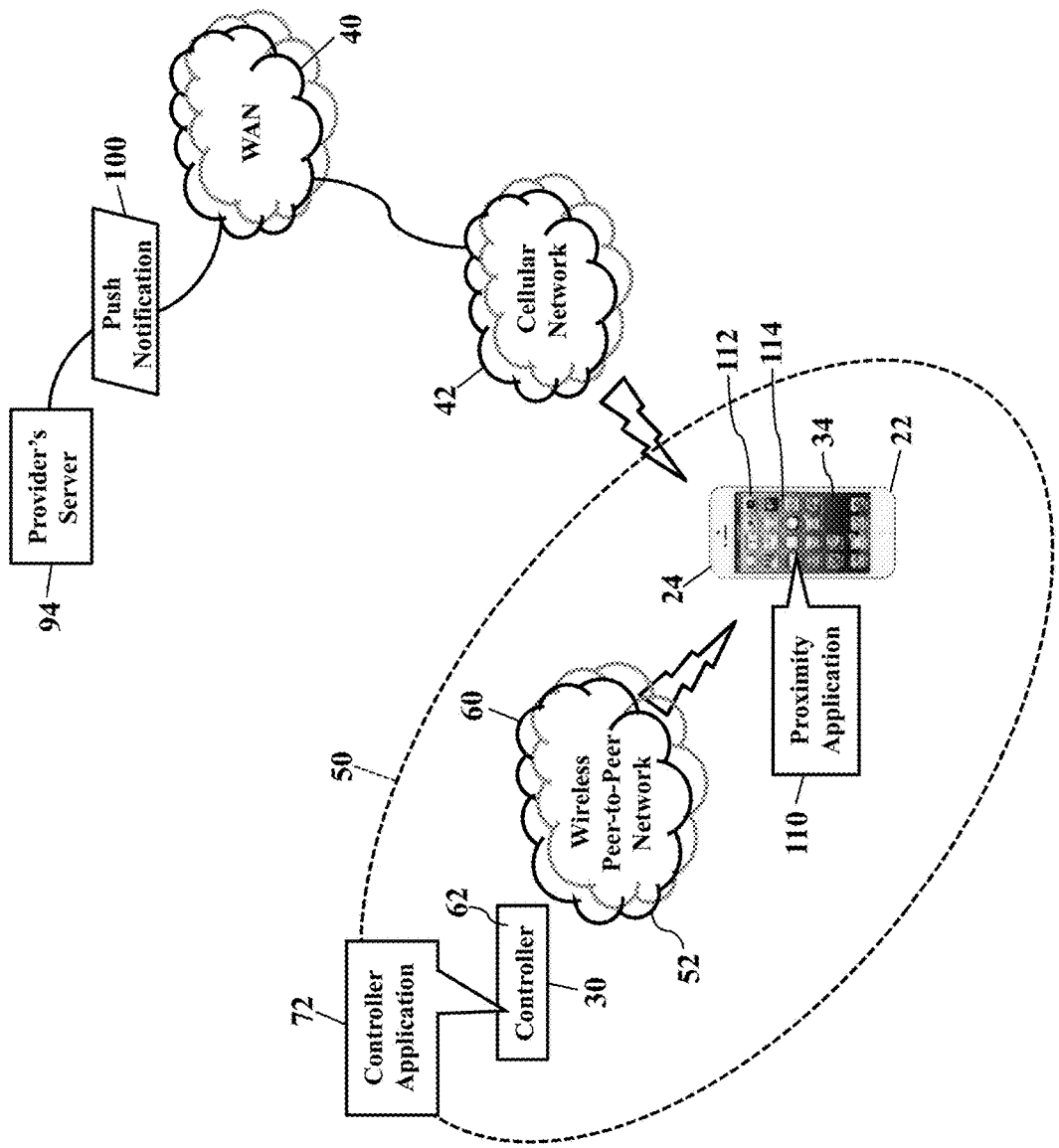

FIGS. 5-7 are more detailed block diagrams illustrating the operating environment, according to exemplary embodiments. Whenever the controller 30 needs to communicate with the mobile device 22, the controller 30 may first determine the geographic proximity 50 of the mobile device 22. If the mobile device 22 is geographically close, the controller 30 may select the shorter communications path 52 for a more efficient routing assignment. As FIG. 5 illustrates, the controller 30 has a processor 70 (e.g., "µP"), application specific integrated circuit (ASIC), or other component that executes a controller application 72 stored in a memory device 74. The controller application 72 instructs the processor 70 to perform operations, such as detecting or determining if the mobile device 22 is reachable using the shorter communications path 52 via the wireless peer-to-peer network 60. If the controller 30 and the smartphone 24 can communicate using device-to-device communications protocols via the wireless peer-to-peer network 60, a more efficient routing path exists.

FIG. 6 illustrates sensory event notification. The controller 30 of the security system 32 interfaces with many sensory devices. This disclosure already explained how the controller 30 interfaces with the doorbell 20 and the camera 26. The security system 32, though, may additionally or alternatively interface with other sensors 80, such as infrared or ultrasonic detectors, smoke/heat/monoxide sensors, water sensors, contact elements, and many other sensory elements. Whatever the sensor 80, the controller 30 may receive a sensor notification 82. For example, when the visitor rings the doorbell 20, the doorbell 20 sends the sensor notification 82 as a signal or message to the controller 30. When the controller 30 receives the sensor notification 82, the controller application 72 determines if remote notification is required. The controller application 72 is commonly configured to remotely notify of many events, such as the visitor activating the doorbell 20. The controller application 72 causes the controller 30 to query for a remote notification address 84. Whenever remote notification is required, the controller 30 may be programmed to query for and retrieve one or more remote notification addresses 84. FIG. 6 illustrates the remote notification address 84 being locally retrieved, but the remote notification address 84 may be remotely retrieved from any memory device that is accessible to, or operatively coupled with, the controller 30. For simplicity, the remote notification address 84 may be a cellular telephone number and/or an email address, which most readers are assumed familiar.

The controller 30 may then notify an operator's server 90 in the wide area communications network ("WAN") 40. As the reader may understand, the wide area communications network 40 may be operated or provided by a network service provider. The controller 30, for example, sends an electronic notification message 92 to a network address (e.g., Internet Protocol address) associated with the operator's server 90. The controller 30 may packetize the notification message 92 into packets of data according to a packet protocol, such as the Internet Protocol. The packets of data contain bits or bytes of data describing the contents, or payload, of a message. A header of each packet of data may contain routing information identifying an origination address and/or a destination address. The controller 30 calls or invokes a network interface to send the electronic notification message 92 into the wide area communications network 40 for routing and delivery to the network address assigned to the operator's server 90.

The electronic notification message 92 may identify the remote notification address 84. When the controller 30 sends the packetized notification message 92, the notification message 92 may include bits or bytes that identify the remote notification address 84. The notification message 92, for example, may include data representing an email address and/or a cellular identifier that is to be remotely notified. The cellular identifier may uniquely identify the mobile device 22 using a cellular telephone number, International Mobile Subscriber Identity, or Mobile Station International Subscriber Directory Number.

FIG. 6 also illustrates push notifications. Once the controller 30 notifies the operator's server 90, the operator's server 90 may forward or relay the notification message 92 to a push notification service provider. FIG. 6 illustrates the operator's server 90 sending the electronic notification message 92 to a network address associated with a provider's server 94 operating in the service provider's cloud network 96. While the provider's server 94 may be controlled or operated by any service provider, the reader is perhaps most familiar with an APPLE® or ANDROID® push notification service. The provider's server 94 generates and sends (or "pushes") an electronic push notification 100 addressed to the remote notification address 84 (such as the email address and/or the cellular identifier associated with the smartphone 24). The electronic push notification 100 may utilize any messaging or notification service (such as Apple's push notification service, Microsoft's messenger service, or Google's cloud messaging service). Regardless, the provider's server 94 pushes the electronic push notification 100 to the mobile device 22 using the email address and/or the cellular identifier associated with the smartphone 24. The push notification 100 alerts the mobile device 22 to some event, such as the requirement for remote notification from the controller 30.

FIG. 7 illustrates proximity detection. The push notification 100 routes through the wide area communications network 40 and is broadcast from a base station antenna in the cellular network 42. When the mobile device 22 receives the electronic push notification 100, the mobile device 22 launches a proximity application 110. The mobile device 22 (such as the smartphone 24) also houses a processor 112 and a memory device 114. When the mobile device 22 receives the electronic push notification 100, the electronic push notification 100 may identify the proximity application 110 and cause the processor 112 in the mobile device 22 to launch or awaken the proximity application 110. As the proximity application 110 is executed, the proximity application 110 has program code, instructions, and/or an algorithm that performs operations, such as detecting if the mobile device 22 is within the geographic proximity 50 of the controller 30. The mobile device 22 thus calls, retrieves, and/or executes the proximity application 110 in response to receipt of the electronic push notification 100. The proximity application 110, for example, instructs the mobile device 22 to initiate wireless communication with the transceiver 62 in the controller 30. The mobile device 22, for example, may be preregistered with the controller 30, thus allowing the wireless recognition using cellular, wireless fidelity ("WI-FI®"), and/or BLUETOOTH® technologies. If the mobile device 22 and the controller 30 can communicate using the wireless peer-to-peer network 60, then exemplary embodiments may infer or conclude that the mobile device 22 is reachable and within the geographic proximity 50 of the controller 30, based on wireless reception using the wireless peer-to-peer network 60. The controller 30 and the mobile device 22 may thus communicate using the shorter communications path 52 offered by the wireless peer-to-peer network 60. However, if the mobile device 22 and the controller 30 cannot establish communication using the wireless peer-to-peer network 60, exemplary embodiments may conclude that the mobile device 22 is not within the geographic proximity 50 of the controller 30.

Exemplary embodiments may thus push or force the shorter communications path 52. If the mobile device 22 is preregistered with the controller 30, exemplary embodiments may force or reestablish communication using the wireless peer-to-peer network 60. Even if the mobile device 22 is not currently registered to the wireless peer-to-peer network 60, then exemplary embodiments may force registration to establish the shorter communications path 52. Any push notification service may thus be used relieve packet traffic in the wide area communications network 40 and in the cellular network 42.

Figure 8:
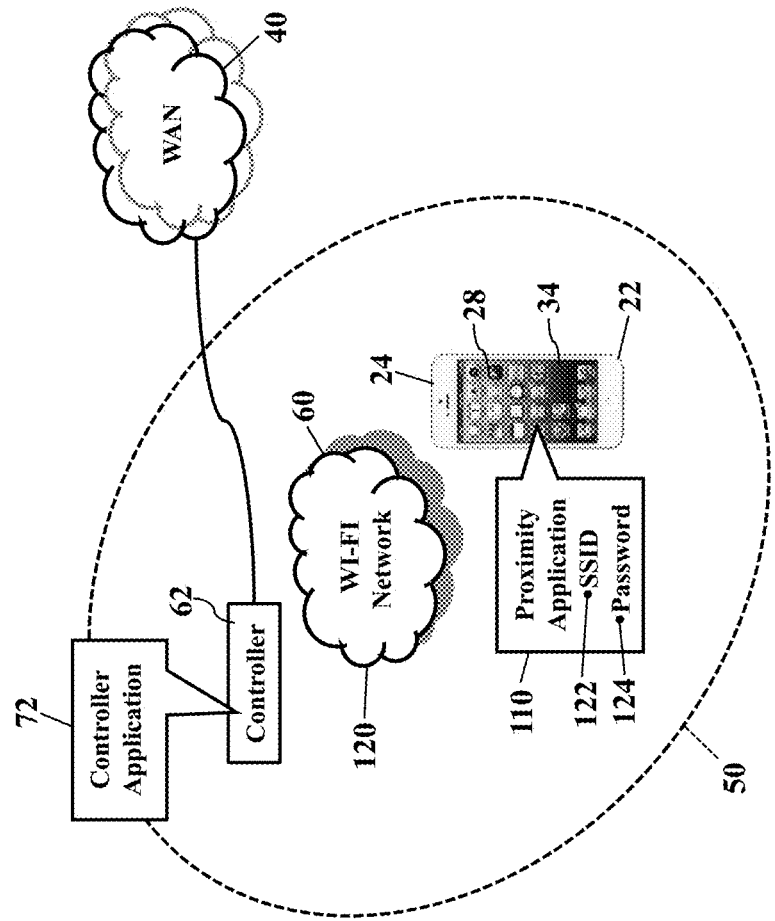
FIGS. 8-9 are schematics further illustrating device-to-device communication, according to exemplary embodiments.
Figure 9:
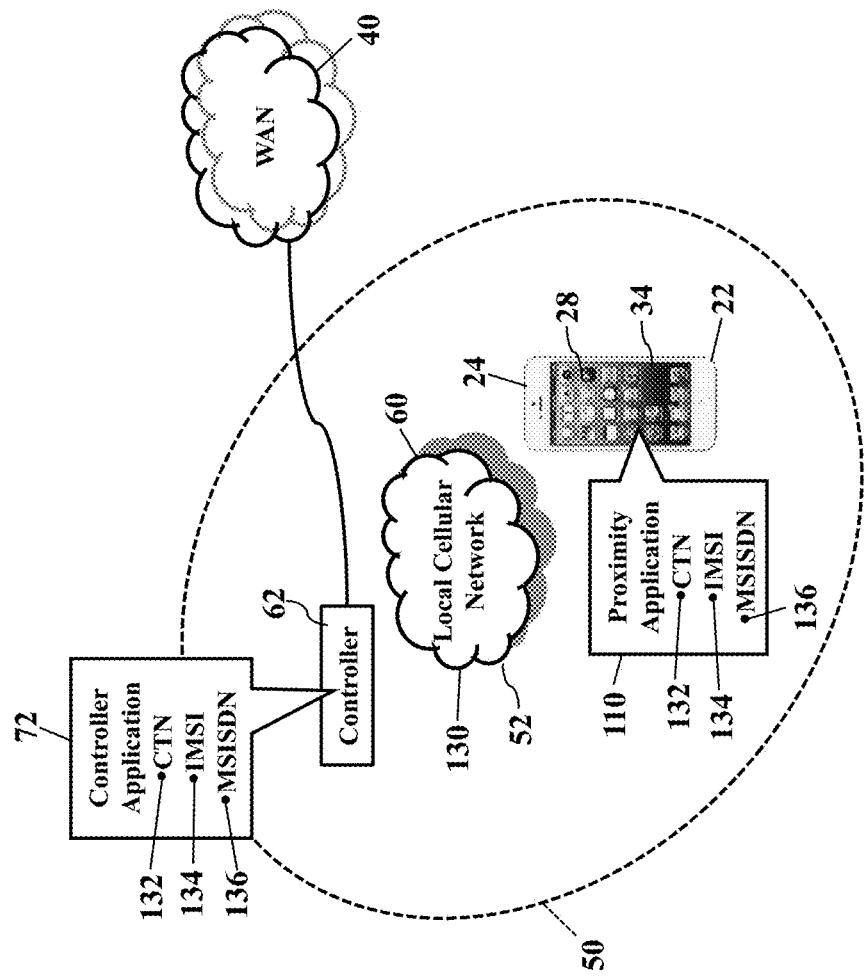

FIGS. 8-9 are schematics further illustrating device-to-device communication, according to exemplary embodiments. FIG. 8 illustrates the wireless peer-to-peer network 60 as a wireless fidelity ("WI-FI") network 120. When the mobile device 22 authenticates to the WI-FI® network 120, the controller 30 and the mobile device 22 may communicate using device-to-device communication protocols. The mobile device 22 may retrieve a service set identifier 122 and a network password 124 to register with the wireless fidelity network 120. The controller 30 may thus bypass the wide area communications network 40 and, instead, instruct the wireless transceiver 62 to transmit the video data 28 for reception at the subnetworking mask address assigned to or associated with the smartphone 24. The controller 30 and the mobile device 22 may thus use device-to-device communication protocols to transfer the video data 28. As the smartphone 24 is within transmission range, the shorter communications path 52 offered by the wireless fidelity network 120 may be preferred. The mobile device 22 processes the video data 28 for display, thus providing remote notification.

Exemplary embodiments need only authenticate once. When the controller 30 and the mobile device 22 initially authenticate, exemplary embodiments may store and retrieve the authentication credentials (e.g., the SSID 122 and network password 124) for future uses. That is, when the controller 30 and the mobile device 22 recognize each other, formal authentication need not be repeated. Exemplary embodiments, however, may be configured to require authentication with each session. Moreover, authentication may bypass the wide area communications network 40 operated or provided by a network service provider. When the authentication relies on the wireless peer-to-peer network 60, signaling overhead and delay is reduced.

FIG. 9 illustrates cellular communication. Here the controller 30 may have cellular transmission capabilities, thus allowing device-to-device communication using cellular frequencies and standards. FIG. 9 illustrates the wireless peer-to-peer network 60 as a local cellular network 130. The controller 30 may have multiple transceivers, allowing the controller 30 to establish wireless communication using several different standards and frequency ranges in the electromagnetic spectrum. If the controller 30 and the mobile device 22 can establish cellular communication using device-to-device cellular communication protocols, exemplary embodiments may infer or conclude that the mobile device 22 is reachable and within the geographic proximity 50 of the controller 30, based on wireless reception using the local cellular network 130. Cellular communication may thus utilize unique cellular identifiers, such as the cellular telephone number ("CTN") 132, International Mobile Subscriber Identity (or "IMSI") 134, or Mobile Station International Subscriber Directory Number ("MSISDN") 136. Again, then, the controller 30 may thus bypass the wide area communications network 40 and, instead, instruct the wireless transceiver 62 to transmit the video data 28 for reception at the cellular network address assigned to or associated with the smartphone 24. The controller 30 and the mobile device 22 may thus use device-to-device communication protocols to transfer the video data 28. As the smartphone 24 is within transmission range, the shorter communications path 52 offered by the local cellular network 130 may be preferred. The mobile device 22 processes the video data 28 for display, thus providing better video quality with reduced network congestion.

Figure 10:
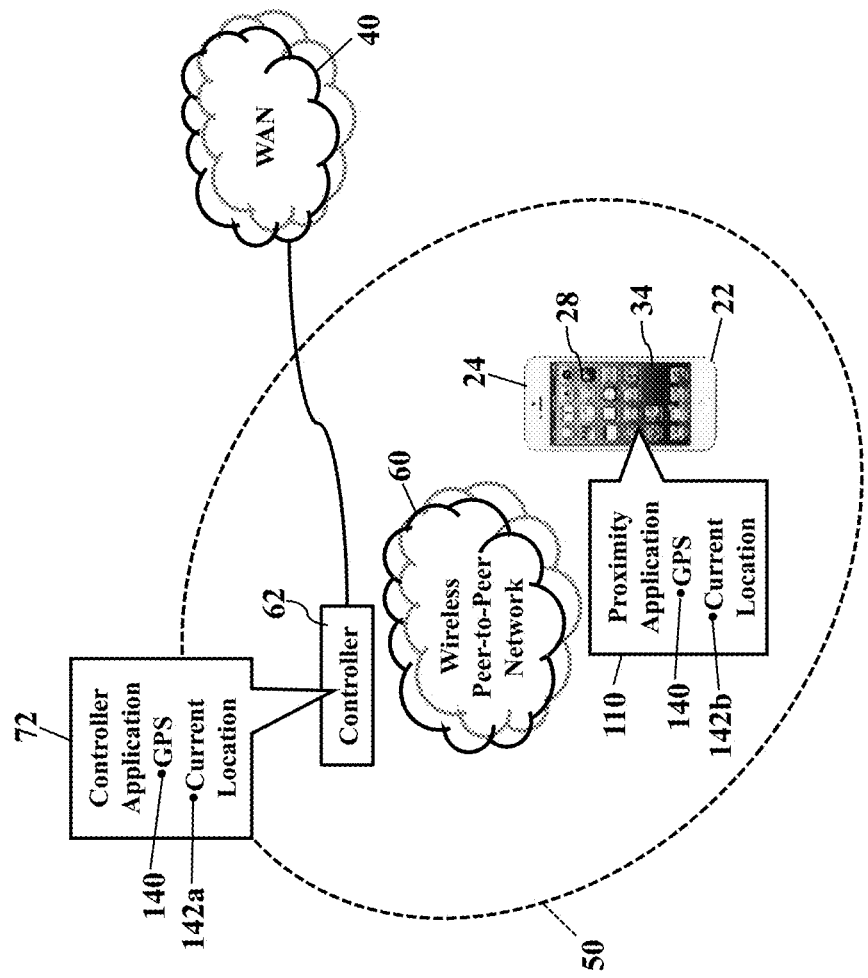
FIGS. 10-12 are schematics illustrating usage of locational information, according to exemplary embodiments.
Figure 11:
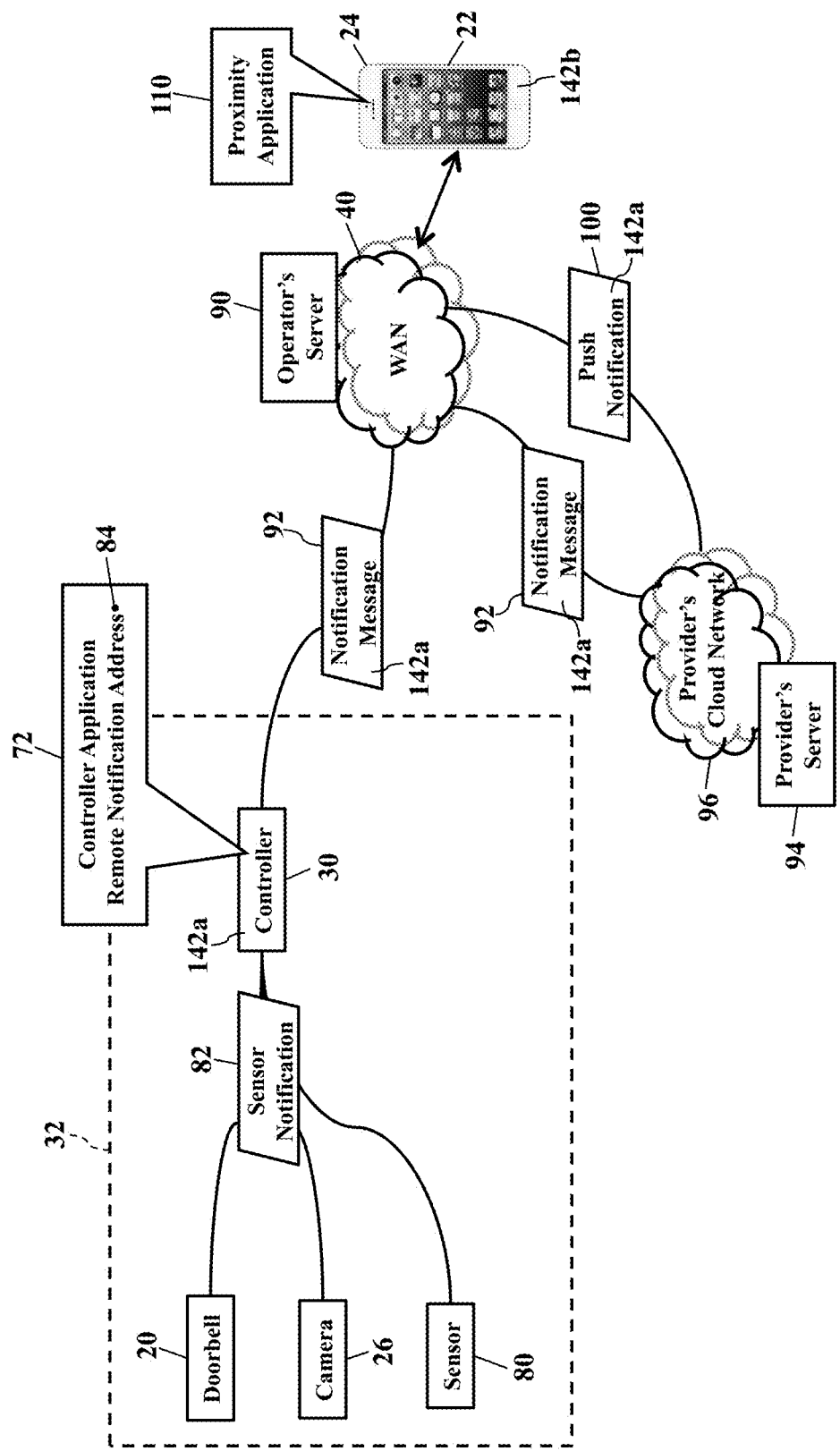
Figure 12:
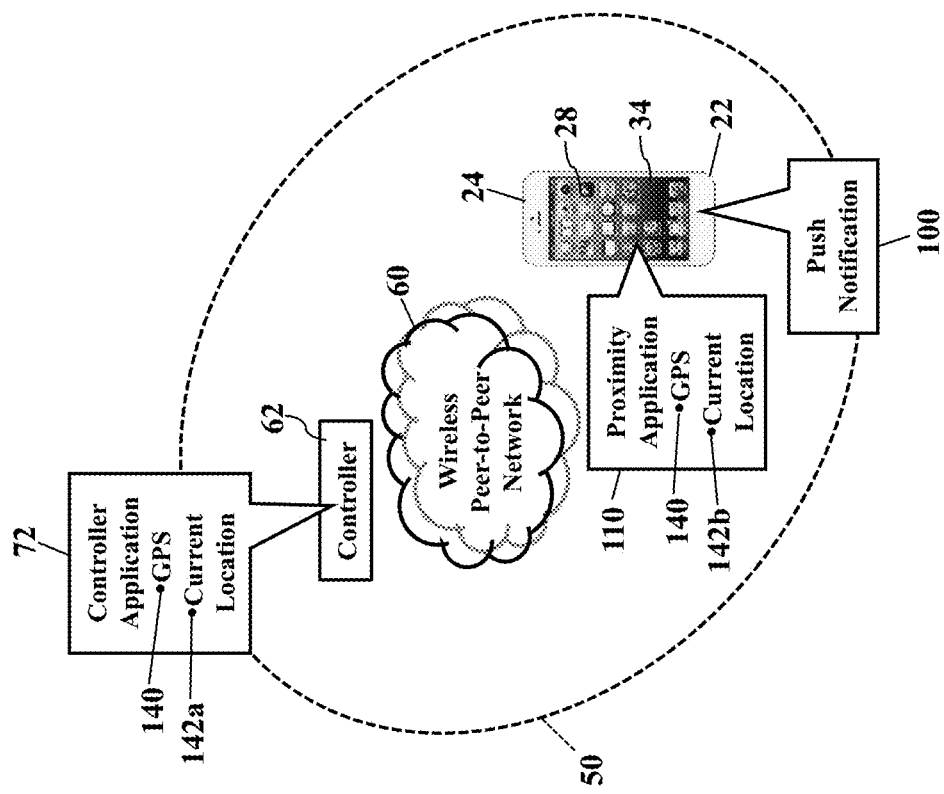

FIGS. 10-12 are schematics illustrating usage of locational information, according to exemplary embodiments. Here the geographic proximity 50 may be determined using global positioning system information 140. When the mobile device 22 executes the proximity application 110, the mobile device 22 may retrieve its current location 142. As the reader may understand, many electronic devices have a global positioning system receiver and circuitry that determines the current location 142 based on the global positioning system information 140. As FIG. 10 illustrates, when the mobile device 22 and the controller 30 communicate using the wireless peer-to-peer network 60, the mobile device 22 may sends its current location 142 to the controller 30. The controller 30, likewise, may retrieve and exchange its own current location 142, perhaps determined by its own internal global positioning system receiver and circuitry. The controller application 72 and the proximity application 110 may thus cooperate to determine the geographic proximity 50. For example, exemplary embodiments may compare the current location 142a of the controller 30 to the current location 142b associated with the mobile device 22. If the current locations 142a and 142b match, then exemplary embodiments may infer or conclude that the mobile device 22 is within the geographic proximity 50 of the controller 30, based on matching global positioning system information 140. Exemplary embodiments, however, may still infer the geographic proximity 50 if a difference between the current locations 142a and 142b is equal to or less than some threshold value (such as a maximum coordinate radius about the controller 30 or a maximum linear or length distance from the controller 30). GPS technology may thus be used to select the shorter communications path 52 offered by the wireless peer-to-peer network 60.

FIG. 11 illustrates locational push notifications. Here electronic push notification 100 may include locational information of the controller 30. For example, when the controller 30 needs to remotely notify the remote notification address 84 of some sensory event, the controller 30 sends the electronic notification message 92 to the operator's server 90. Here, though, the controller application 72 may include the current location 142a of the controller 30, as perhaps represented by global positioning system information (determined by its own internal global positioning system receiver and circuitry). The operator's server 90 then sends the electronic notification message 92 to the network address associated with the provider's server 94 operating in the service provider's cloud network 96. Again, though, the electronic notification message 92 may include header or packet data that identifies the global positioning system information representing the current location 142a of the controller 30. The provider's server 94 generates and sends (or "pushes") the electronic push notification 100 addressed to the remote notification address 84 (such as the email address and/or the cellular identifier associated with the smartphone 24). Here, though, the electronic push notification 100 may also include header and/or packet information that identify the global positioning system information representing the current location 142a of the controller 30. Exemplary embodiments may thus push the GPS coordinates associated with the controller 30 when alerting the mobile device 22 of any sensory event.

Exemplary embodiments may determine the geographic proximity 50. Now that the current location 142a of the controller 30 is known, exemplary embodiments may determine the geographic proximity 50. For example, the controller application 72 and/or the proximity application 110 may compare the current location 142a of the controller 30 (obtained from the electronic push notification 100) to the current location 142b associated with the mobile device 22. If the current locations 142a and 142b match, then exemplary embodiments may infer or conclude that the mobile device 22 is within the geographic proximity 50 of the controller 30, based on matching global positioning system information 140. Exemplary embodiments, however, may still infer the geographic proximity 50 if a difference between the current locations 142a and 142b is equal to or less than some threshold value (such as a maximum coordinate radius about the controller 30 or a maximum linear or length distance from the controller 30). GPS technology may thus be used to select the shorter communications path 52 offered by the wireless peer-to-peer network 60.

FIG. 12 further illustrates the geographic proximity 50. Once the mobile device 22 is informed of the current location 142a of the controller 30, exemplary embodiments may determine the geographic proximity 50 based on wireless reception. The electronic push notification 100 causes the mobile device 22 to launch or awaken the proximity application 110 (as earlier explained). The proximity application 110 causes the mobile device 22 to initiate wireless communication with the transceiver 62 in the controller 30 using cellular, wireless fidelity ("WI-FI®"), BLUETOOTH®, or any other short-range or near-field technology. If the mobile device 22 and the controller 30 can establish communication using the wireless peer-to-peer network 60, then exemplary embodiments may infer or conclude that the mobile device 22 is within the geographic proximity 50 of the controller 30. The controller 30 and the mobile device 22 may thus communicate using the shorter communications path 52 offered by the wireless peer-to-peer network 60. However, if the mobile device 22 and the controller 30 cannot establish communication using the wireless peer-to-peer network 60, exemplary embodiments may conclude that the mobile device 22 is not within the geographic proximity 50 of the controller 30.

Figure 13:
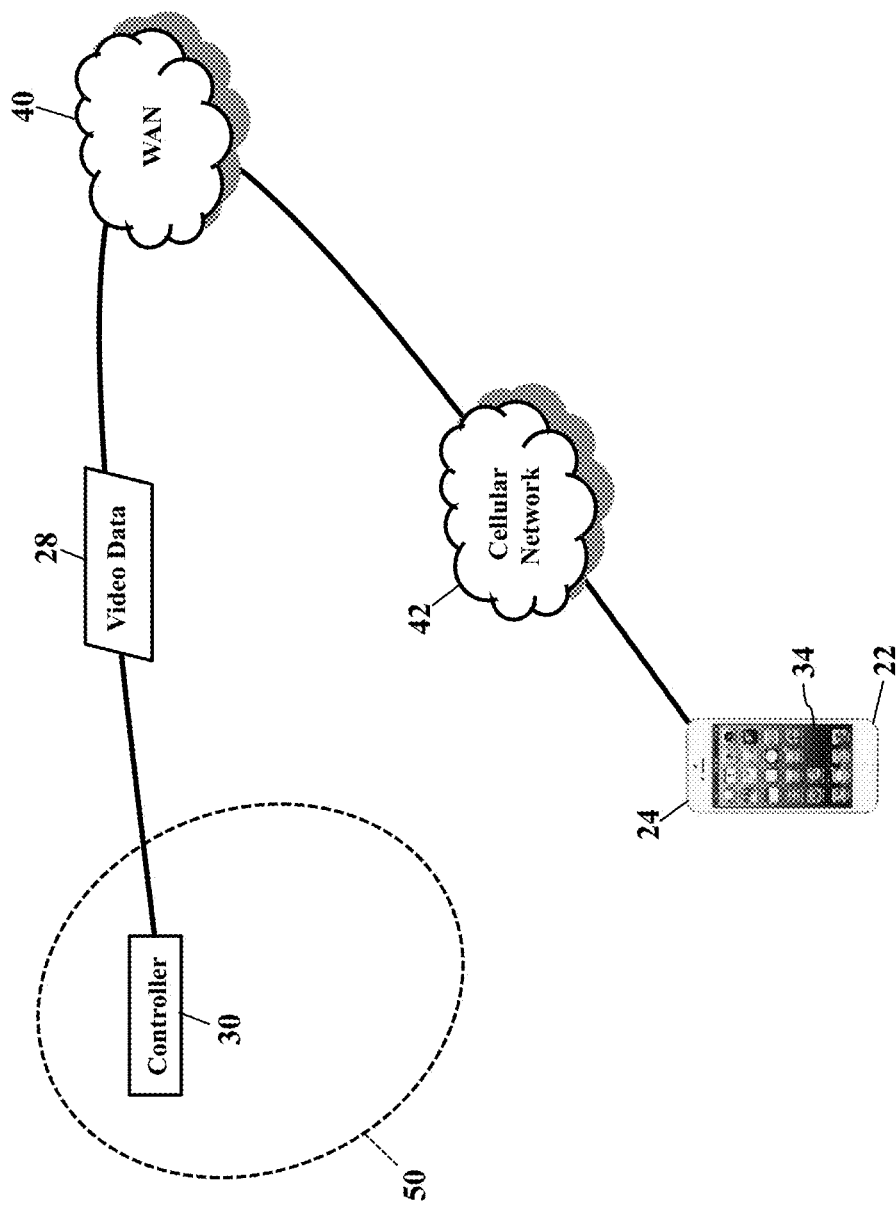
FIGS. 13-14 are schematics illustrating routing paths, according to exemplary embodiments.
Figure 14:
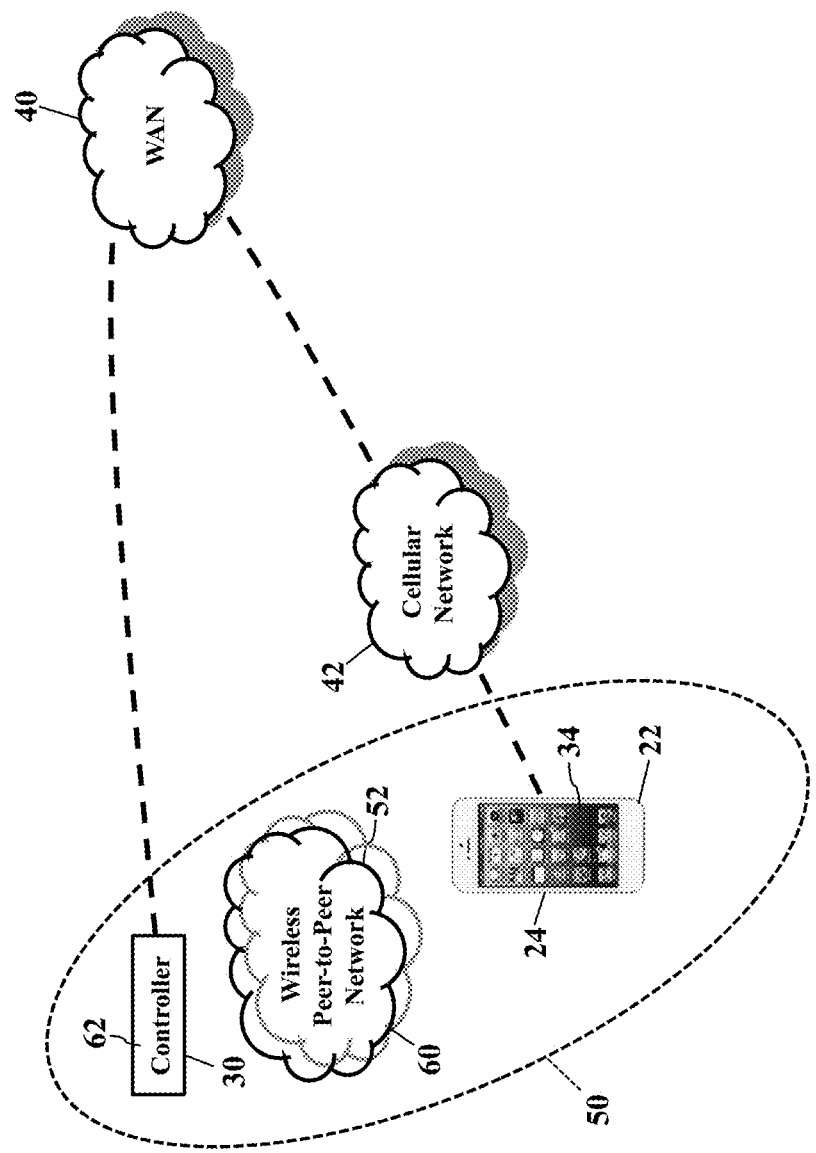

FIGS. 13-14 are schematics illustrating routing paths, according to exemplary embodiments. FIG. 13 illustrates an exemplary routing of the video data 28 when proximity is not determined. For example, if the controller 30 and the mobile device 22 cannot verify the geographic proximity 50, the controller 30 may route the video data 28 into the wide area communications network 40. The video data 28 traverses links and segments in the wide area communications network 40 for eventual routing into the cellular network 42 for wireless transmission to the mobile device 22. Again, this routing may traverse many miles, consuming bandwidth and introducing delay and jitter.

FIG. 14, though, illustrates the shorter communications path 52. If the controller 30 and the mobile device 22 authenticate using the wireless peer-to-peer network 60, the controller 30 may decline the wide area communications network 40. The controller 30, instead, instructs the wireless transceiver 62 to transmit the video data 28 using the wireless peer-to-peer network 60. The wireless peer-to-peer network 60 provides the shorter communications path 52, thus consuming little or perhaps no bandwidth in the wide area communications network 40. The shorter communications path 52 consumes little or perhaps no bandwidth or electromagnetic spectrum in the cellular network 42. Indeed, the efficiencies are significant, especially considering the cumulative effects of thousands or even millions of users requesting video data in today's mobile society.

Figure 15:
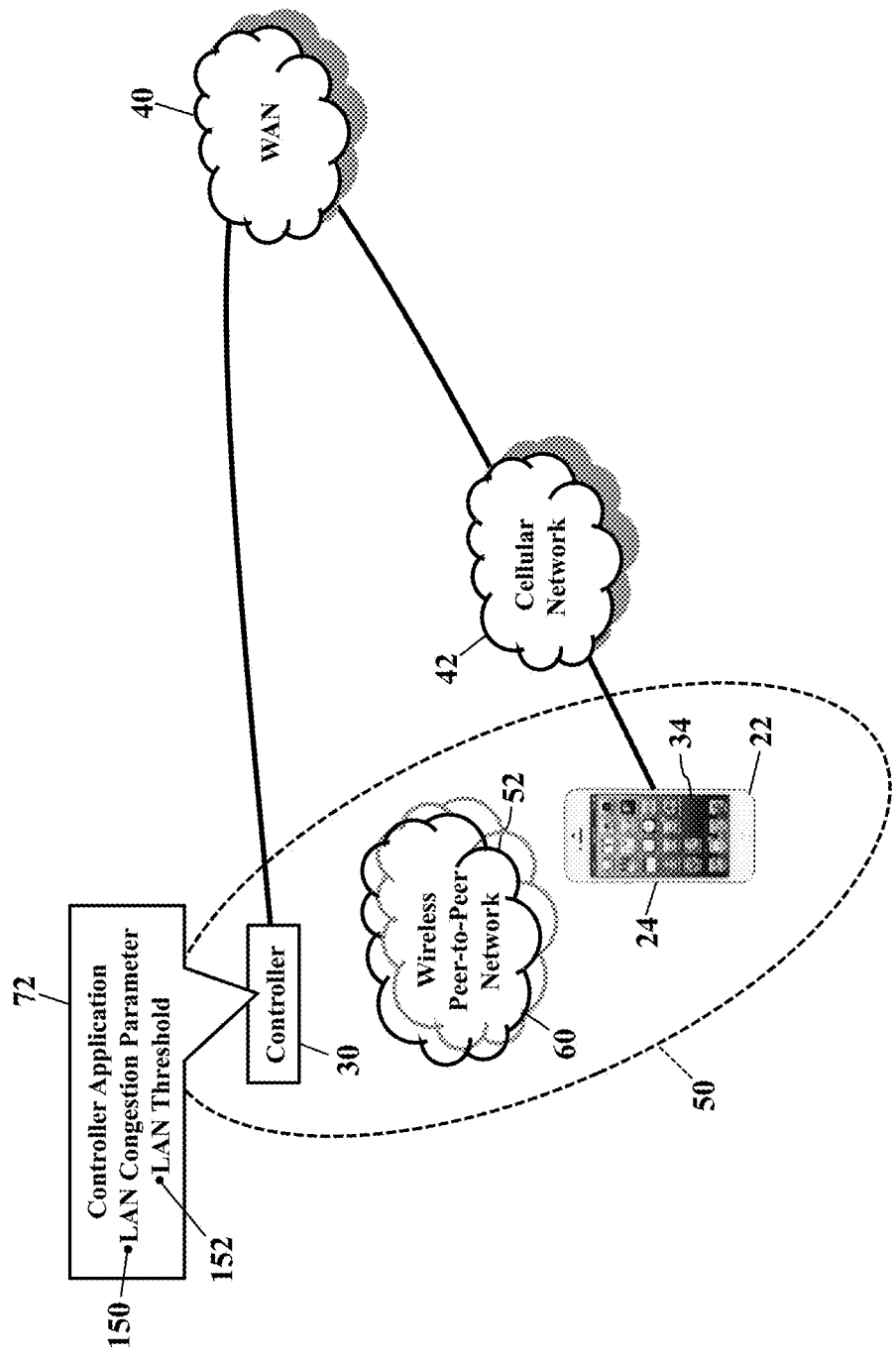
FIGS. 15-17 are schematics illustrating additional routing examples, according to exemplary embodiments.
Figure 16:
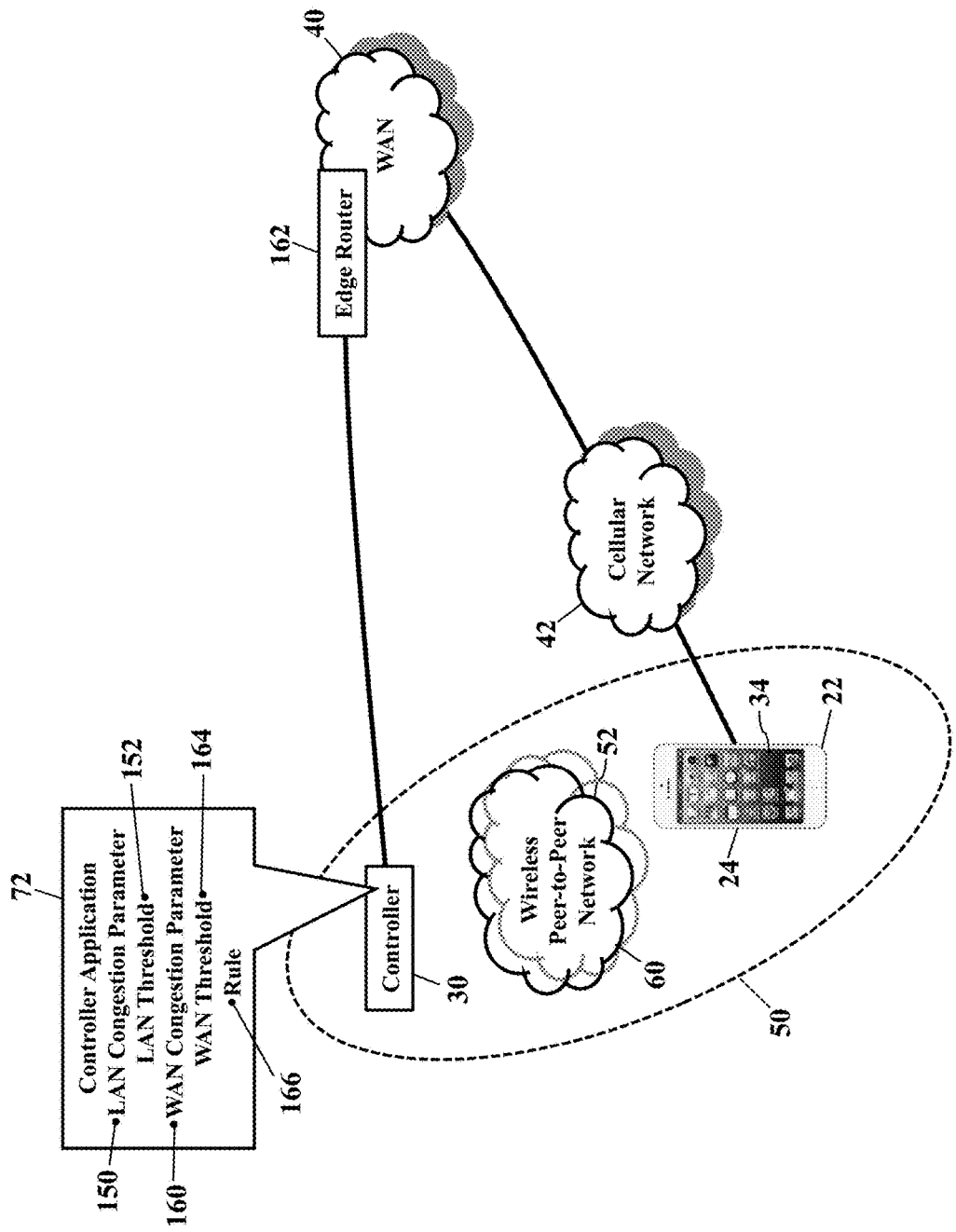
Figure 17:
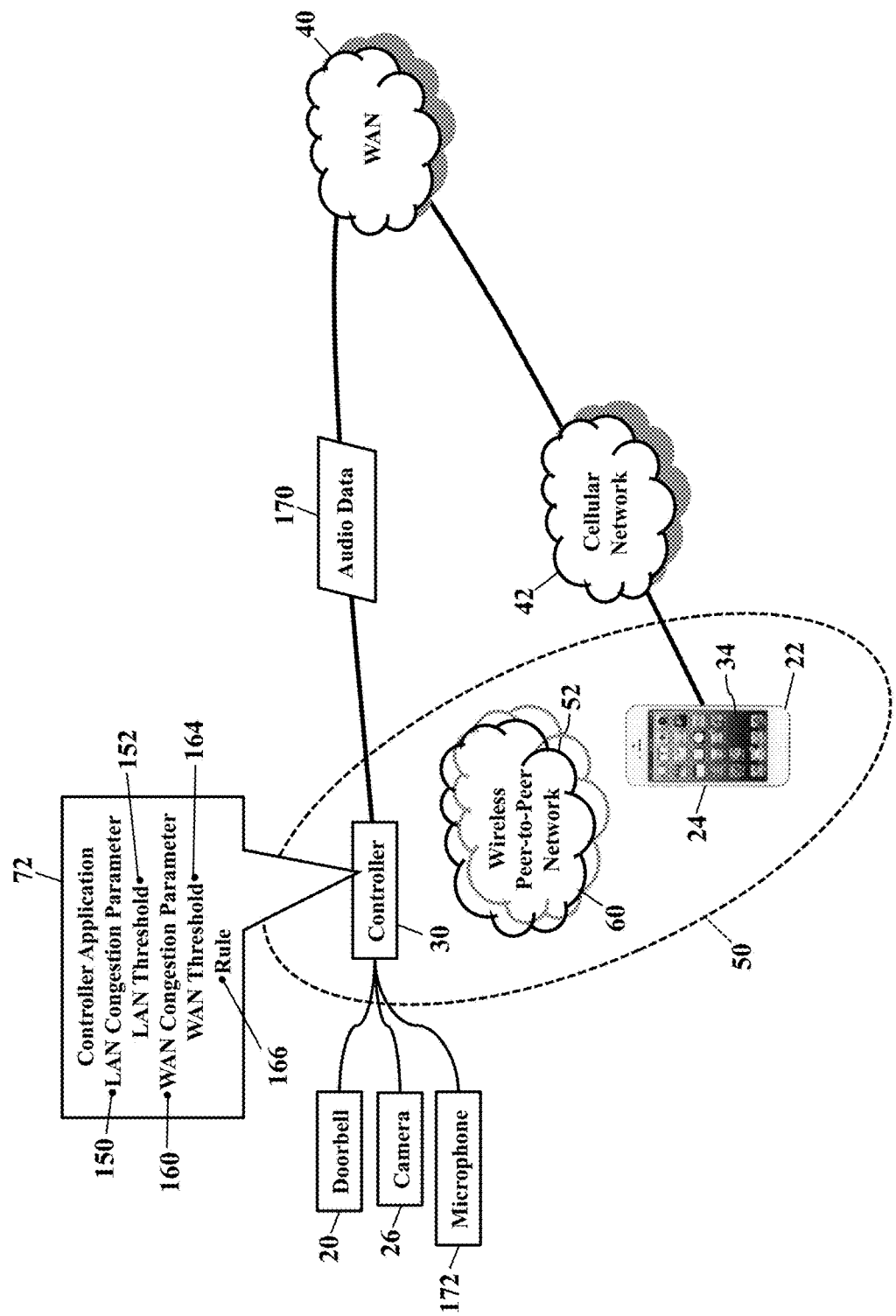

FIGS. 15-17 are schematics illustrating additional routing examples, according to exemplary embodiments. Even if the mobile device 22 is proximate the controller 30, exemplary embodiments may still implement routing decisions based on radio and network conditions. That is, even if the mobile device 22 and the controller 30 can communicate using device-to-device protocols, exemplary embodiments may still prefer the wide area communications network 40. Network and radio considerations may influence the controller 30 to select a routing into the wide area communications network 40. For example, in FIG. 15, the controller 30 may determine that the wireless peer-to-peer network 60 is too congested for delivery of the video data 28. Suppose, for example, that the controller 30 determines there is limited or even unavailable bandwidth in the wireless peer-to-peer network 60. The controller 30, then, may resort to the wide area communications network ("WAN") 40. Indeed, there may be times when the wide area communications network 40 has ample bandwidth, perhaps during off-peak uncongested hours. The controller 30 may thus receive or retrieve a LAN congestion parameter 150 describing congestion or load in the wireless peer-to-peer network 60. The controller application 72 may compare the LAN congestion parameter 150 to a LAN threshold value 152. If the LAN congestion parameter 150 is less than the LAN threshold value 152, then the controller 30 may route the video data 28 into the wireless peer-to-peer network 60 for wireless transmission to the mobile device 22. However, if the LAN congestion parameter 150 is equal to or greater than the LAN threshold value 152, then the controller 30 may route the video data 28 into the wide area communications network 40 for transmission from the cellular network 42.

FIG. 16 illustrates further decisional analysis. Here the controller 30 may also evaluate the congestion in the wide area communications network 40. The controller 30, for example, may receive a WAN congestion parameter 160 describing congestion or load in the wide area communications network 40. While the WAN congestion parameter 160 may be received from any network element or device, FIG. 16 illustrates an edge router 162 originating the WAN congestion parameter 160 to the controller 30. The controller 30 may thus weigh or evaluate the congestion in both the wide area communications network 40 (based on the WAN congestion parameter 160) and in the wireless peer-to-peer network 60 (based on the LAN congestion parameter 150). The controller application 72 may compare the LAN congestion parameter 150 and the WAN congestion parameter 160 to respective threshold values 152 and 154. The controller application 72 may then retrieve one or more logical rules 166 for selecting which routing is preferred. For example, if cellular bandwidth or spectrum is more plentiful, the controller 30 may prefer the wide area communications network 40 and the cellular network 42. If the wireless peer-to-peer network 60 has ample bandwidth, the controller 30 may prefer the wireless peer-to-peer network 60. Of course, if the mobile device 22 lacks the geographic proximity 50, the controller 30 may default to the wide area communications network 40.

FIG. 17 illustrates separate video and voice routings. Here the controller 30 may also receive or process audio data 170 (such as a digital recording of the voice of the visitor ringing the doorbell 20). Again, as the reader may imagine, many security systems may have both the camera 26 and a microphone 172 trained or aimed to capture video and voice of the visitor at the front door. The microphone 172 may interface with a voice codec that outputs the packetized audio data 170 for receipt by the controller 30. Here, then, the controller 30 may need to route both the video data 28 and the audio data 170 to the user's mobile device 22 for remote notification. The controller 30 may thus again receive and compare the LAN congestion parameter 150 and/or the WAN congestion parameter 160 and to their respective threshold values 152 and 164. The controller application 72 may then retrieve the logical rule(s) 166 for selecting which routing is preferred. For example, the controller 30 may prefer to stream the lower bandwidth audio data 170 into the wide area communications network 40 and the cellular network 42 to maintain quality of voice data. The controller 30, however, may prefer to route the higher bandwidth stream of video data 28 into the wireless peer-to-peer network 60. Exemplary embodiments may thus prefer high quality, lower bandwidth remote notification of the audio data 170, thus perhaps ensuring the user's smartphone 24 accurately renders the visitor's voice via the cellular network 42. The video data 28 may be delivered by the wireless peer-to-peer network 60 for improved synchronization. Indeed, if congestion is high, exemplary embodiments may sacrifice the quality or timing of the video data 28 to ensure voice signals are delivered.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may be applied to other networking environments. For example, the controller 30 and the mobile device 22 may establish BLUETOOTH® and/or other near-field communications links. If the user's mobile device 22 and the controller 30 can establish device-to-device communication using a BLUETOOTH® and/or other near-field communications link, exemplary embodiments may conclude or infer that the mobile device 22 and the controller 30 are geographically close to each other. Device-to-device communication alleviates broadband usage of the wide area communications network 40 and the cellular network 42, as previously explained.

Exemplary embodiments may be applied to video storage. While the controller 30 is described as a component of the security system 32, exemplary embodiments may be applied to any operating environment. For example, the controller 30 may be a component of a video storage system. The controller 30 may control or manage access to stored content, whether rented or owned. In other words, the controller 30 may control or manage access to a vault that stores home videos, digital pictures and other electronic images, music, software applications, backup and archival data, and any other electronic content or information. The controller 30 may still have multiple transmitters for multiple network interfaces, and/or the controller 30 may communicate with a router also having multiple transmitters for multiple network interfaces. Indeed, exemplary embodiments may be applied to any device-to-device opportunity.

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 18:
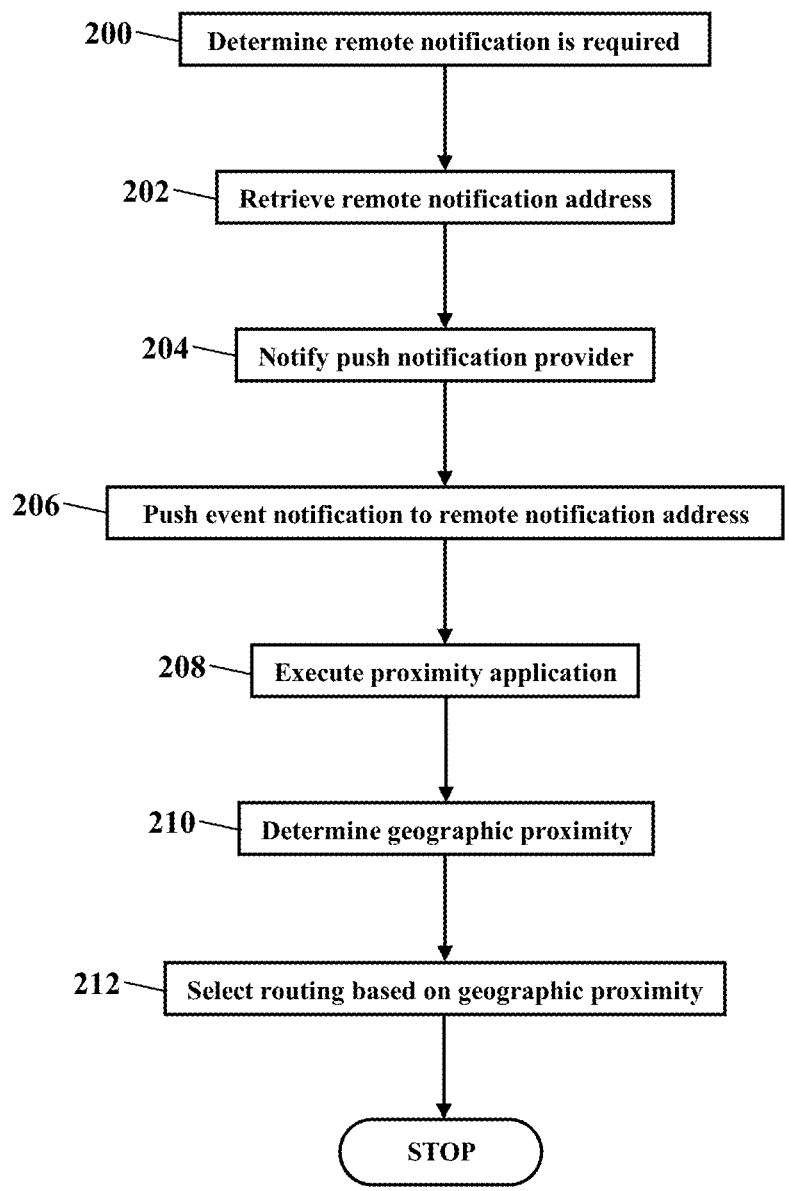
FIG. 18 is a flowchart illustrating an algorithm for efficient routing, according to exemplary embodiments.

FIG. 18 is a flowchart illustrating an algorithm for efficient routing, according to exemplary embodiments. The controller 30 determines remote notification is required (Block 200). The controller 30 retrieves the remote notification address 84 (Block 202) and notifies the push notification provider (Block 204). The push notification provider sends the push notification 100 to the remote notification address 84 (Block 206). The proximity application 110 executes (Block 208). The controller application 72 and the proximity application 110 cooperate to determine the geographic proximity 50 between the controller 30 and the mobile device 22 (Block 210). The controller 30 selects a routing based on the geographic proximity 50 (Block 212).

Figure 19:
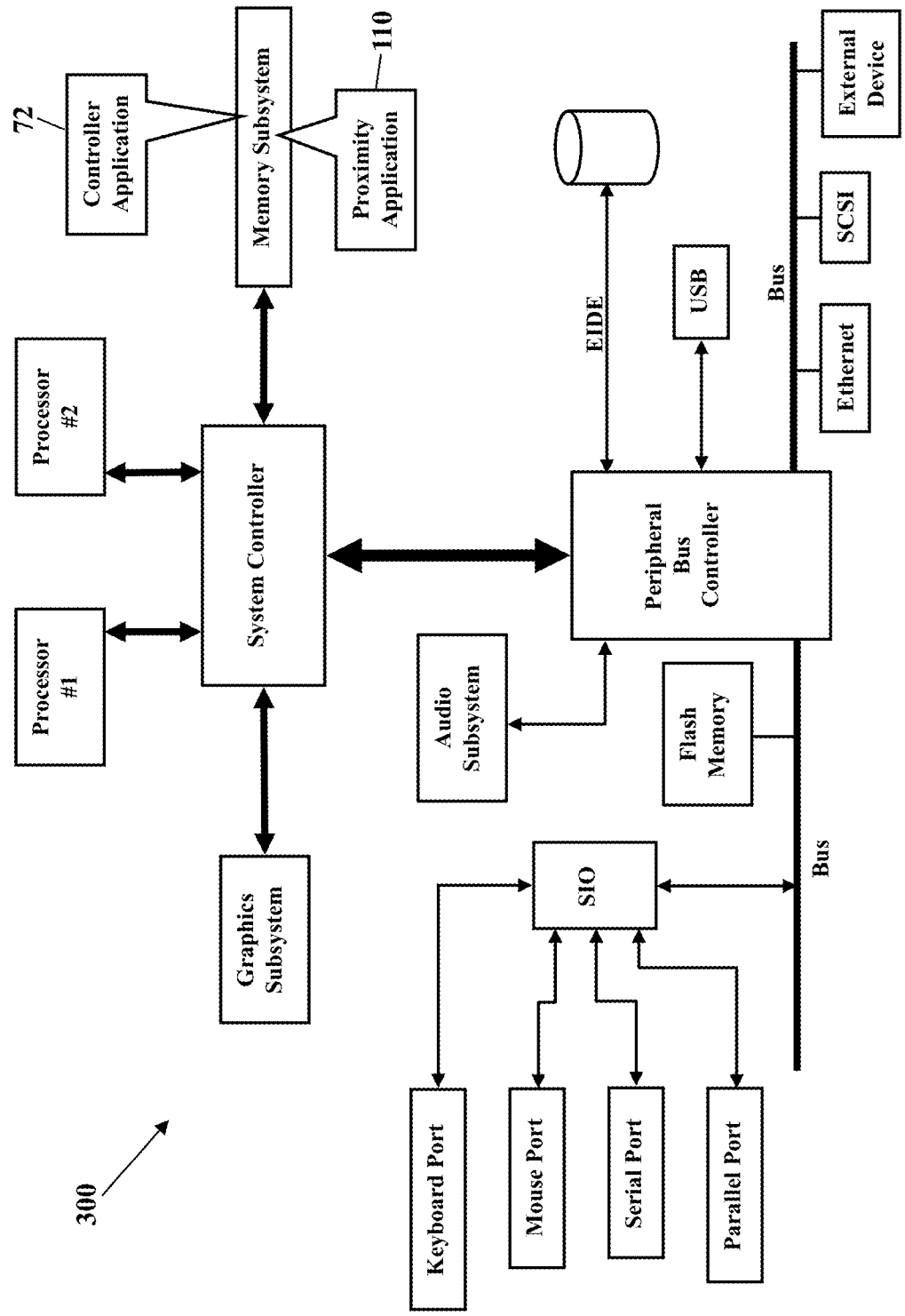

FIG. 19 is a schematic illustrating still more exemplary embodiments. FIG. 19 is a more detailed diagram illustrating a processor-controlled device 300. As earlier paragraphs explained, the controller application 72 and/or the proximity application 110 may partially or entirely operate in any mobile or stationary processor-controlled device. FIG. 19, then, illustrates the controller application 72 and/or the proximity application 110 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 20:
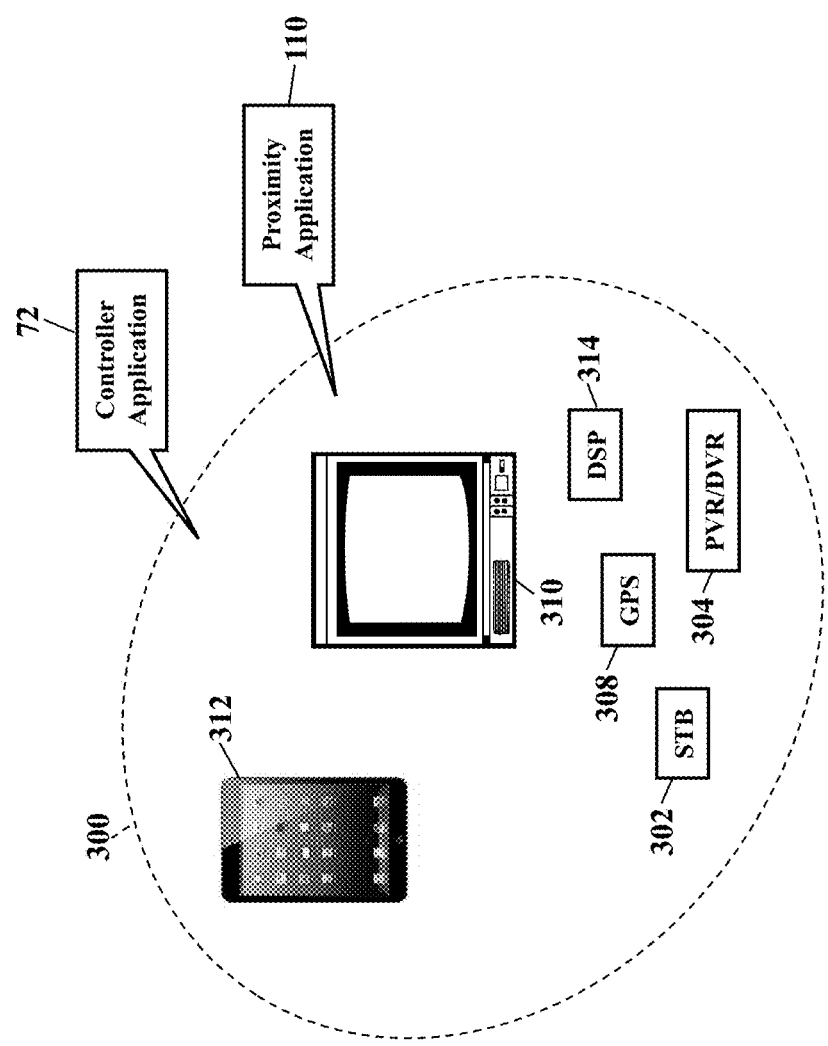

FIG. 20 depicts other possible operating environments for additional aspects of the exemplary embodiments. FIG. 20 illustrates the controller application 72 and/or the proximity application 110 operating within various other processor-controlled devices 300. FIG. 20, for example, illustrates that the controller application 72 and/or the proximity application 110 may entirely or partially operate within a set-top box ("STB") (302), a personal/digital video recorder (PVR/DVR) 304, a Global Positioning System (GPS) device 308, an interactive television 310, a tablet computer 312, or any computer system, communications device, or processor-controlled device utilizing any of the processors above described and/or a digital signal processor (DP/DSP) 314. Even if the processor-controlled device 300 lacks GPS capability, the processor-controlled device 300 may be pre-configured with fixed GPS coordinates, perhaps representing an installed or operating location. For example, the processor-controlled device 300 may be a wired or wireless router. Regardless, a user interface may permit entry of GPS coordinates after installation and/or a relocation. Moreover, the processor-controlled device 300 may also include wearable devices (such as watches), radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Figure 21:
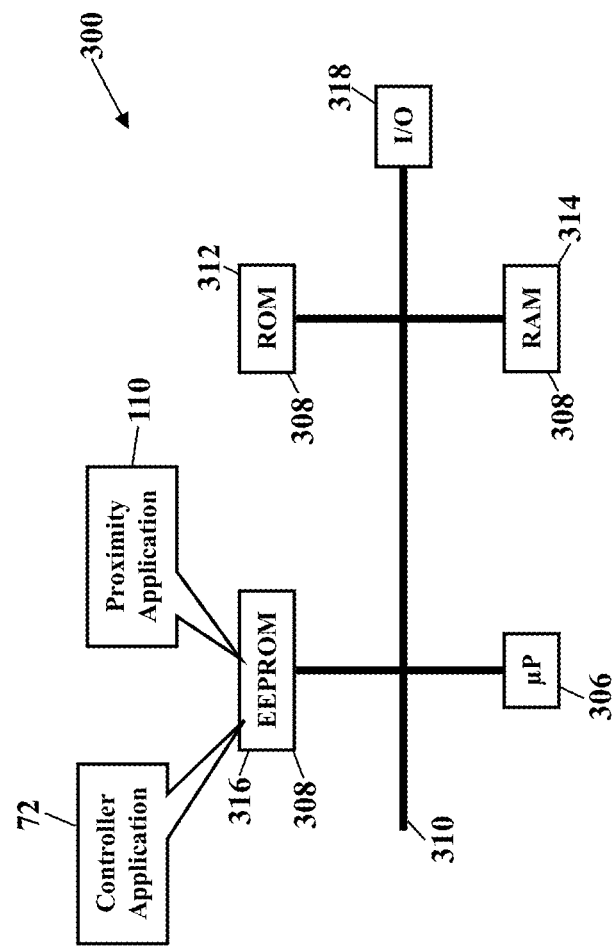
Figure 23:
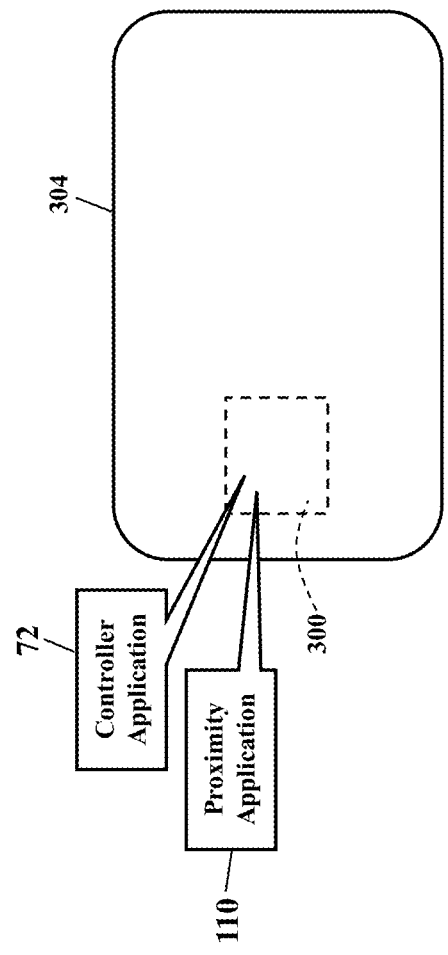
Figure 22:
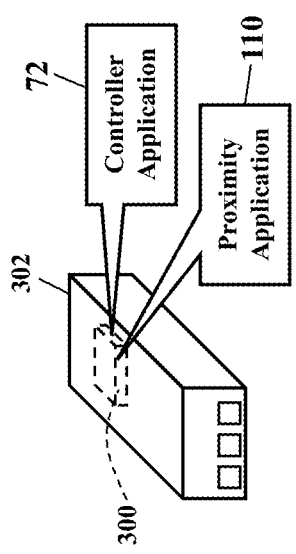

FIGS. 21-23 are schematics further illustrating various communications devices for presenting ring tones, according to exemplary embodiments. FIG. 21 is a block diagram of a Subscriber Identity Module 300, while FIGS. 22 and 23 illustrate, respectively, the Subscriber Identity Module 300 embodied in a plug 302 and in a card 304. As those of ordinary skill in the art recognize, the Subscriber Identity Module 300 may be used in conjunction with many communications devices (such as the mobile device 22 and the controller 30). The Subscriber Identity Module 300 stores user information (such as the user's International Mobile Subscriber Identity, the user's $K_i$ number, and other user information) and any portion of the controller application 72 and/or the proximity application 110. As those of ordinary skill in the art also recognize, the plug 302 and the card 304 each may interface with the mobile device 22 and/or the controller 30.

FIG. 21 is a block diagram of the Subscriber Identity Module 300, whether embodied as the plug 302 of FIG. 22 or as the card 304 of FIG. 23. Here the Subscriber Identity Module 300 comprises a microprocessor 306 (µP) communicating with memory modules 308 via a data bus 310. The memory modules 308 may include Read Only Memory (ROM) 312, Random Access Memory (RAM) and or flash memory 314, and Electrically Erasable-Programmable Read Only Memory (EEPROM) 316. The Subscriber Identity Module 300 stores some or all of the controller application 72 and/or the proximity application 110 in one or more of the memory modules 308. FIG. 21 shows the controller application 72 and/or the proximity application 110 residing in the Erasable-Programmable Read Only Memory 316, yet either module may alternatively or additionally reside in the Read Only Memory 312 and/or the Random Access/Flash Memory 314. An Input/Output module 318 handles communication between the Subscriber Identity Module 300 and the communications device. Because Subscriber Identity Modules are well known in the art, this patent will not further discuss the operation and the physical/memory structure of the Subscriber Identity Module 300.

FIG. 24 is a schematic further illustrating the operating environment, according to exemplary embodiments. FIG. 24 is a block diagram illustrating some componentry of the mobile device 22 and/or the controller 30. The componentry may include one or more radio transceiver units 352, an antenna 354, a digital baseband chipset 356, and a man/machine interface (MMI) 358. The transceiver unit 352 includes transmitter circuitry 360 and receiver circuitry 362 for receiving and transmitting radio-frequency (RF) signals. The transceiver unit 352 couples to the antenna 354 for converting electrical current to and from electromagnetic waves. The digital baseband chipset 356 contains a digital signal processor (DSP) 364 and performs signal processing functions for audio (voice) signals and RF signals. As FIG. 24 shows, the digital baseband chipset 356 may also include an on-board microprocessor 366 that interacts with the man/machine interface (MMI) 358. The man/machine interface (MMI) 358 may comprise a display device 368, a keypad 370, and the Subscriber Identity Module 300. The on-board microprocessor 366 may also interface with the Subscriber Identity Module 300 and with the controller application 72 and/or the proximity application 110.

Exemplary embodiments may be applied to any signaling standard. As those of ordinary skill in the art recognize, FIGS. 21-24 may illustrate a Global System for Mobile (GSM) communications device. That is, the communications device may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for optimized routing, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a wireless device, a notification from a cloud-based service identifying a proximity application;
in response to the notification from the cloud-based service, executing, by the wireless device, the proximity application;
determining, by the wireless device executing the proximity application, dual communications paths to a security system;
identifying, by the wireless device executing the proximity application, a logical rule that specifies a selection of a peer connectivity of the dual communications paths to the security system; and
in response to the logical rule, selecting, by the wireless device executing the proximity application, the peer connectivity for communications with the security system.

2. The method of claim 1, further comprising determining the peer connectivity of the wireless device to the security system.

3. The method of claim 1, further comprising receiving a wireless network broadcast by the security system.

4. The method of claim 1, further comprising determining a cellular network as the peer connectivity.

5. The method of claim 1, further comprising determining a congestion associated with the one of the dual communications paths.

6. The method of claim 1, further comprising sending the communications between the wireless device and the security system via a local area network.

7. The method of claim 1, further comprising sending the communications between the wireless device and the security system via a wide area network.

8. The method of claim 1, further comprising establishing the dual communications paths to the security system via a wide area network and via a local area network.

9. A system, comprising:
a hardware processor; and
a memory device storing instructions that, when executed by the hardware processor, perform operations, the operations comprising:
receiving a notification from a cloud-based service, the notification identifying a proximity application;
in response to the notification from the cloud-based service, determining dual communications paths to a controller associated with a security system by executing the proximity application;
selecting one of the dual communications paths having a peer connectivity to the controller associated with the security system; and
sending a data via the one of the dual communications paths having the peer connectivity to the controller associated with the security system.

10. The system of claim 9, wherein the operations further comprise determining a network broadcast by the controller associated with the security system.

11. The system of claim 9, wherein the operations further comprise determining the peer connectivity to a wireless network broadcast by the controller associated with the security system.

12. The system of claim 9, wherein the operations further comprise determining the peer connectivity to a cellular network.

13. The system of claim 9, wherein the operations further comprise receiving a wireless local area network broadcast by the controller.

14. The system of claim 9, wherein the operations further comprise identifying a logical rule associated with the peer connectivity.

15. The system of claim 9, wherein the operations further comprise sending communications to the controller via a wireless local area network.

16. The system of claim 9, wherein the operations further comprise establishing the dual communications paths to the controller via both a wide area network and a local area network.

17. A memory device storing instructions that when executed by a hardware processor perform operations, the operations comprising:
receiving a push notification sent to a wireless device from a cloud-based service, the push notification identifying a proximity application;
in response to the push notification from the cloud-based service, determining dual communications paths for communications between the wireless device and a controller associated with a security system by executing the proximity application;
forcing a selection of one of the dual communications paths having a peer connectivity to a wireless network broadcast by the controller associated with the security system;
registering the wireless device to the wireless network broadcast by the controller; and sending the communications from the wireless device to the controller via the one of the dual communications paths having the peer connectivity to the wireless network broadcast by the controller associated with the security system.

18. The memory device of claim 17, wherein the operations further comprise sending a video data via the one of the dual communications paths having the peer connectivity to the wireless network broadcast by the controller.

19. The memory device of claim 18, wherein the operations further comprise sending an audio data via the one of the dual communications paths having the peer connectivity to the wireless network broadcast by the controller.

20. The memory device of claim 17, wherein the operations further comprise:
   separating a video data from an audio data;
   sending the video data from the controller to the wireless device via the one of the dual communications paths having the peer connectivity to the wireless network broadcast by the controller; and
   sending the audio data from the controller to the wireless device via another one of the dual communications paths.

\* \* \* \* \*